(No Model.)

J. A. KING & J. LITTLE.
FURNACE FOR THE MANUFACTURE OF GLASS.

No. 279,254. Patented June 12, 1883.

Witnesses:
J Angelo Fahie C E
William Rice.

Inventors:
James A King
John Little

UNITED STATES PATENT OFFICE.

JAMES A. KING AND JOHN LITTLE, OF DUBLIN, IRELAND.

FURNACE FOR THE MANUFACTURE OF GLASS.

SPECIFICATION forming part of Letters Patent No. 279,254, dated June 12, 1883.

Application filed September 6, 1882. (No model.) Patented in England July 12, 1881, No. 3,050.

*To all whom it may concern:*

Be it known that we, JAMES ALEXANDER KING and JOHN LITTLE, of Charlotte Quay, Dublin, Ireland, subjects of the United Kingdom of Great Britain and Ireland, have invented new and useful improvements in apparatus used in furnaces or tanks employed for the purpose of carrying on the manufacture of glass; and we do hereby declare that the following is a full, clear, and exact description of the invention, which will enable others skilled in the art to which it appertains to make and use the same.

The object of our invention is to devise apparatus of simple construction for use in connection with furnaces or tanks for the manufacture of glass, and is especially designed for application or use in glass furnaces or tanks as at present constructed, whereby the working out of the melted material may be carried on in a continuous or intermittent manner, and a greater yield of glass obtained than by any method hitherto in use, so far as we are aware.

The first part of our invention relates to the construction of apparatus for continuous working; and it consists in forming an open band or ring of suitable size, shape, and material, which floats in the molten mass, combined with a covered pot so arranged that its working-out hole will be presented to the gathering-hole of the tank, through which the operator draws the liquid material. As the crude materials are melted in the tank, the liquid, becoming denser, sinks to the bottom and passes into the outer ring, where, becoming more fined, it again passes into the covered pot, from which it is worked out.

The second part of our invention relates to the carrying on of the said manufacture on the intermittent system. For this purpose we propose to use within the open band or ring first hereinbefore described, a second or inner ring, from which the liquid material is worked out, the object of the second band or ring being to allow the melted glass to flow in underneath its sides free from the foam and other impurities floating on the surface of the liquid outside and around the ring.

The accompanying sheet of drawings will enable our said invention to be more readily understood.

Figure 1:
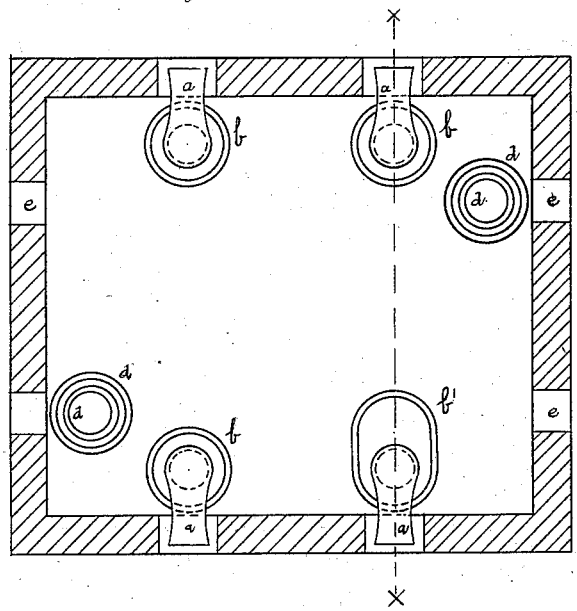
Figure 2:
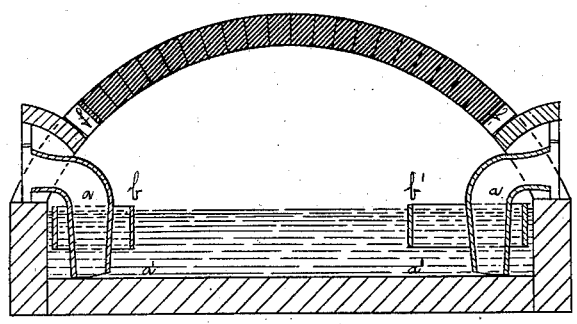

Figure 1 represents a sectional plan view of a tank or furnace constructed in the ordinary manner; and Fig. 2 is a transverse section on line $x\ x$, Fig. 1.

In both views, *a a* represent the covered pots hereinbefore described, the mouths of which are presented and secured to the gathering-holes of the tank or furnace, as seen in Fig. 2, and the bottoms of which are open and slightly beveled in section, as shown at $a'$, Fig. 2, for the purpose of allowing the pure and refined material to flow in from the bottom or lowest stratum of the tank. This pot need not, however, reach quite to the bottom of the tank, but may be fixed at any suitable depth desirable, with a view to obtaining the purest stratum of molten material in the tank.

*b b* are the rings encircling the pots and floating in the molten material, the principal objects of these rings being to further facilitate the supply of pure material to the covered pots, and also to prevent the more crude and less perfectly fused material, which usually floats on the surface of the tank, from coming in contact with the outer surface of the covered pots, and thereby impairing them. These rings may be formed circular or oblong, or any shape suitable for the purpose in view; but we prefer to use them in the oblong form, as shown at $b'$.

*d d* are the rings, one placed within the other, which we propose to use for the purpose of carrying on the manufacture of glass on the intermittent system, the melted material being worked out through the gathering-hole from the inner ring, while the outer ring fulfills similar functions to those described in reference to the rings *b b* in relation to the covered pots. *e e* are ordinary feeding-holes, through which the raw material is supplied to the tank, and which may be arranged in any suitable part thereof.

For the better working of our said invention we provide apertures $f\ f$ in the crown of the furnace, immediately over the covered pots, whereby the heat in the tank is drawn up and around the pots, thereby keeping same in a thoroughly heated condition, and facilitating the working out of the refined material contained therein. These apertures may be closed or opened by suitable valves, as may be desired.

A single floating ring or vessel with perforations has been before used in glass-tank furnaces to allow the melted glass to flow inward free from the surface material. Such we do not claim, broadly.

Having thus described our said invention, what we desire to claim and secure by Letters Patent is—

1. The floating rings $b$, having a space left between them and the bottom of the tank, in combination with covered pots or gathering-hoods $a$, having one edge elevated or cut away, as shown at $a'$, substantially as herein set forth.

2. In a tank for the manufacture of glass, the combination of two or more floating rings arranged one within the other, each having an open bottom, substantially in the manner and for the purposes set forth.

3. In a glass-furnace, the combination, with the covered pots $a$, of the furnace-crown provided with the apertures $f\ f$, for the purpose of forming a draft for the heat around the pots $a$, substantially as herein set forth.

JAMES A. KING.
JOHN LITTLE.

Witnesses:
J. ANGELO FAHIE, C. E.,
WILLIAM RICE,
Both of 2 Nassau Street, Dublin.